3,434,979
OLEOPHILIC-HYDROPHILIC ION
EXCHANGE RESINS
Harry P. Gregor, 150 Lakeview Ave., Leonia, N.J.
07605; Philippe Teyssié, 41 bis Ave. de Lorraine,
Le Vesinet, France; and Guenther K. Hoeschele,
2007 Dogwood Lane, Wilmington, Del. 19803
No Drawing. Filed May 11, 1965, Ser. No. 455,005
Int. Cl. C08f 27/06
U.S. Cl. 260—2.1          4 Claims

ABSTRACT OF THE DISCLOSURE

The invention is directed to a novel ion-exchange resin comprisng a polymeric matrix having a carbon-chain backbone and regularly-occurring polar ion exchange groups and regularly-occurring oleophilic groups as side groups on said backbone.

---

This invention relates to a novel ion-exchange resins. In particular, this invention relates to oleophilic ion-exchange resins which are capable of swelling and exhibiting effective ion-exchange activity in nonpolar solvents, and the invention relates most especially to novel ion-exchange resins which are both oleophilic and hydrophilic. Such resins are more or less equally wettable by, and swellable in, nonpolar solvents such as benzene, toluene and hexane and polar solvents such as water, lower aliphatic alcohols and the like.

Many varieties of ion-exchange resins have heretofore been proposed, and many of them have been introduced through commerical channels and have enjoyed considerable success in various applications.

Almost without exception, such ion-exchange resins, and particularly those which have achieved commercial acceptance, have been designed for and used in aqueous environments exclusively. The reason is to be found in the fact that the effectiveness of an ion-exchange resin depends to a great extent on the ease with which the ion-bearing solvent—and hence the ions—can reach all of the exchangeable groups. Although capable of being influenced to some extent by applied forces such as electrophoretic potentials, osmotic pressures and hydrostatic heads, the permeation of the resin by the solvent is primarily a matter of diffusion.

As originally produced, ion-exchange resins ordinarily have a dense microstructure, the individual particles of resin being devoid of pores, or at least devoid of pores sufficiently large to permit access of the ion-bearing solvent into the interior of the particle. In the original state, therefore, such resins can exhibit only an ion-exchange capacity corresponding to that of the exchangable groups on the particle surfaces.

Conventional ion-exchange resins, however, are such that they swell in water. The swelling, in turn, creates a porous microstructure, wherein the individual resin particles are permeable by the ion-bearing solvent (water, in this case), and hence by the ions, providing the effective diameter of the ion does not exceed the pore diameter. Thus, the entire ion-exchange capacity of the resin may be realized, because not only the exchangeable groups on the particle surfaces, but also those in the interiors of the particles are made available.

In some cases, when the ions in the solvent are large ones, the pores developed by this swelling action are comparable in size to the effective diameter of the ion. If the ionic diameter exceeds the pore diameter, the ions are in effect, filtered out at the particle surfaces and, although the particle may be freely permeable by the solvent, the effective ion-exchange capacity is sharply reduced because, again, only the exchangeable groups on the particle surfaces are available. Any condition which tends to reduce the pore size, for example the addition of alcohol to enhance the solubility of the solute tends to bring about a decrease in swelling and thereby pore size.

For many purposes, however, it is desirable to use solvents other than water as the ion-bearing liquid. For example, it may be desired to separate ions of materials which are not soluble in water, or the solvent may be of principal interest, and it may be desired to purify a solvent other than water by removing an undesirable contaminant therefrom, or one may wish to carry out a catalysis in a nonaqueous solvent. Conventional ion-exchange resins do not perform these functions adequately, because they do not swell in solvents other than water.

In other cases, it would be very advantageous to provide an ion-exchange resin that is swellable in both polar and nonpolar solvents. Such a resin, exhibiting ion-exchange properties in both types of environment, would be very useful for certain chromatographic separations involving successive elution with different solvents. Such a resin, also, would simplify regeneration procedures, because it could be regenerated by aqueous agents, even though used for ion-exchange operations in a non-aqueous medium.

One approach to the problem of preserving a swelled, permeable state in a nonaqueous environment has been the preparation of so-called macroporous resins. By employing appropriate diluents during the polymerization of the resin, one may obtain a highly cross-linked network containing a large number of submicroscopic pores. The large internal surface and the relative rigidity of these structures permit rapid reactions between the resin and the solute in any solvent, but because of the intrinsic density and nonswelling characteristics of their structures, the full capacity of the resin cannot be realized in nonpolar solvents. In effect, the macroporous resins are structures characterized by relatively large, permanent connected pores which permit free passage of solvent through the gross structure of the mass, and particles or fibrils of dense, unswollen resin. They are advantageous over conventional resins in that a greater surface area is made available, but remain subject to the objection mentioned above, in that *only* the surface groups are available for many reactions of interest.

An object of the present invention, therefore, is to provide improved ion-exchange resins.

Another object is to provide improved oleophilic ion-exchange resins.

Still another object is to provide improved ion-exchange resins which are both oleophilic and hydrophilic, and develop maximum ion-exchange capacity in both polar and nonpolar solvents.

Another object is to provide methods for making improved ion-exchange resins.

Yet another object is to provide improved separation techniques for separating materials not readily soluble in aqueous liquids.

A further object is to provide improved ion-exchange techniques for purifying nonpolar liquids.

Other objects and advantages will become apparent from the following more complete description and claims.

In one particularly desirable embodiment, this invention contemplates an ion-exchange resin carbon-chain backbone and regularly-occurring polar ion-exchange groups and regularly-occurring oleophilic groups as side groups on said backbone.

In a preferred form of the invention, the polymer has a regularly-occurring phenyl group as a side group, and at least a substantial proportion of the phenyl groups are doubly-substituted by (a) an oleophilic group in the form of an acyl group having from 2 to about 20 carbon atoms and (b) an ion-exchange group.

From the above description, it will be apparent that a typical resin according to the present invention may be characterized by the repeating group

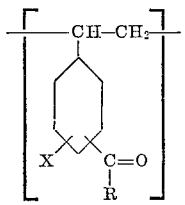

wherein X is an ion-exchange group and R is an aliphatic hydrocarbon radical containing from one to about 19 carbon atoms. The terminal groups are not indicated and generally have little influence on the nature or properties of the resin. Ordinarily, the terminal groups are introduced during the polymerization step, and are determined by the composition of the polymerization reaction mixture. In the usual case, they are either hydrogen, methyl, or alkoxy groups.

The polymer forming the backbone of the resin may be any of the types of polymer commonly used for preparing ion-exchange resins, provided it has, or can be modified to have regularly-occurring polar ion-exchange groups and regularly-occurring oleophilic groups. The preferred polymer is styrene, either in straight-chain form or cross linked moderately with a suitable cross-linking agent such as divinylbenzene.

In the case of styrene, at least a substantial proportion of the phenyl side-groups are doubly-substituted, by two different substituent groups, one of these is the ion-exchange group that confers ion-exchange characteristics on the resin, and may be, for example, a sulfonic acid group or a quaternary ammonium group. The other substituent is oleophilic in nature and may be an aliphatic acyl group. The acyl group or other oleophilic group is an important feature of the invention, and is essential to the development of the desired swelling properties. To provide resins of the preferred type, which are swellable both in polar, and in nonpolar solvents, the oleophilic (as in the case of the acyl group) should contain from 2 to about 20 carbon atoms. Lauroyl is the preferred acyl group for this type of resin, as it tends to give nearly equal degrees of swelling in all solvents ranging from highly polar ones such as water to highly apolar ones such as hexane. When swelling in water is less important and only swelling properties in apolar solvents are of interest, the acyl group may contain up to about 26 carbon atoms. Straight-chain acyl groups are generally preferred, but branched acyl groups may also be used if desired.

Instead of a sulfonic acid group, the ion-exchange group may be a carboxyl group, which gives less acidic exchangeable ions but is useful in many applications, a quaternary ammonium group (which provides an anion exchange resin), or the like.

Instead of an acyl group, the oleophilic group may be a hydrocarbon group, either aliphatic or aromatic.

Thus, useful oleophilic-hydrophilic polymers may be produced by copolymerizing methacrylic acid (MA) with dodecylmethacrylate. In this case the carboxyl groups of the methacrylic acid portion of the polymer constitute the ion-exchange groups, and the dodecyl groups of the dodecylmethacrylate are the oleophilic groups. In this connection, it should be pointed out that when the oleophilic groups and the ion-exchange groups are described as "regularly-occurring," it is not necessarily intended that they appear in a strictly regular sequence along the backbone. The statistical distribution of monomer species ordinarily achieved in copolymerization is contemplated as within the compass of the description.

As another example, oleophilic-hydrophilic ion-exchange resins may be produced by copolymerizing styrene with isobutylene and subsequently sulfonating to produce a cationing exchange resin or chloromethylating and then aminating to produce the corresponding anion-exchange resin.

In order to illustrate more fully the nature of the present invention and the manner of practicing the same, the following examples are presented:

EXAMPLES

Oleophilic sulfonic acid resins were prepared by treatment of polystyrene with a long-chain acyl chloride, followed by sulfonation.

The acylation reactions were carried out in two different ways. In procedure A, 0.05 mole of linear polystyrene was dissolved in dichloroethane (5 grams in 75 ml.). An aluminum chloride-lauroyl chloride (1:1 mole) complex in dichloroethane (22 g., 13 g. and 100 ml., respectively) was prepared at room temperature, and then added dropwise to the polymer solution under nitrogen. The reaction was carried out for 8 hours at 54–58°, then poured into an excess of methanol. Precipitation was facilitated by the addition of 0.1% concentrated sulfuric acid. The polymer was washed with methanol and dried; the yield was 78% of theoretical.

Acylation procedure A was followed with cross-linked polystyrene beads except that these were swelled for a few hours in the solvent before the Friedel-Crafts reaction was carried out, and the beads were purified by extraction with methanol and then with acetone (Soxhlet) until no more aluminum could be detected by the ash test. An extraction with ether was also found to be effective in removing last traces of impurities. The use of chloroform in place of dichlorothane led to the same product.

Acylation procedure B allowed the beads to swell in a solution of lauroyl chloride in dichloroethane overnight, followed by the direct addition of aluminum chloride in powder form. For example, 382 g. of lauroyl chloride in 1.2 l. of dichloroethane was added to 100 g. of beads at room temperature under nitrogen, and then the system kept mildly agitated overnight. The, 230 g. of aluminum chloride was added slowly, the temperature rising to 40°, where it was maintained for several hours. Then more solvent was added and decanted off, following which methanol was added, followed by extration with acetone-methanol-benzene mixtures. Yields by this procedure varied from 80 to 98%.

The acylated linear polystyrene and cross-linked beads prepared by procedure A were sulfonated, using the complex of sulfur trioxide and triethyl phosphate (TEP) formed in dichloroethane, filtered and the product washed with methanol, then water and dried. The linear polymer became insoluble as the sulfonation proceeded; it was washed with solvent, dissolved in ethanol, reprecipitated with dichloroethane and freeze-dried from water.

Sulfonation of acylated polystyrene prepared by procedure B was quite similar, with the complex being formed about 35°, and the sulfonation reaction carried out at that temperature for two hours. For partial sulfonation, the acylated beads were swollen in dichloroethane, then TEP was added, followed by the addition of limited amount of Sulfan B. Under these conditions, only slight warning above room temperature was observed.

When toluene is subjected to a Friedel-Crafts acylation reaction, the acyl group goes almost exclusively to the paraposition. Since this position offers the least stearic hindrance with polystyrene, one can assume that substitution here was predominantly para with respect to the backbone. When a sample of lauroylated polystyrene was extracted with boiling acetone, then boiling benzene, then with a boiling mixture of methanol, acetone and concentrated hydrochloric acid, it showed but an insignificant weight loss, indicative of its stability, and the latter extracts were quite free of low molecular-weight impurities.

It has been found, and is indicated by the data set forth in Table II, that a sulfonate group in the para position has strong water sorption, whereas a sulfonate group in the ortho or meta position to an acyl group does not have this tendency. Also, an acylate group in the para position does not materially increase water sorption by itself. It is therefore generally advantageous to acylate before sulfonating, thereby introducing the acyl group into the para position and blocking that position to the sulfonic acid group, because this order of substitution tends to suppress excessive water sorption to some degree, thereby equalizing swelling in various solvents over the polar-to-apolar spectrum.

The lauroylated-sulfonated resins were stable at room temperature and, when properly extracted, were quite free of analyzable low molecular-weight impurities. When heated in the hydrogen form at 60° for two days they become dark while at 105° in air for three hours they become quite dark in color and showed an irreversibly reduced swelling in alcohols, as an example. In the salt form these resins are considerably more stable. Table I summarizes the properties of the acyl-sulfonated resins, and Table II their swelling properties.

In Tables I and II, the composition and history of the resin is indicated as follows: All resins were prepared from one of these batches of polystyrene, respectively designated 1, 1' and 2.

Resin 1 was a commercial grade of 1% DVB (divinylbenzene) polystyrene beads, −50+100 mesh.

Resin 1' was material similar to Resin 1 but −20+40 mesh.

Resin 2 was of −100+200 mesh, and contained 2% DVB.

Acylated prepartions are designated by a prefix letter to indicate the nature of the acyl group—A for an acetyl group, C for caproyl, L for lauroyl and ST for stearoyl.

Sulfonated preparations are designated by the prefix S.

Where more than one portion of resin was subjected to treatment with the same acyl chloride, the examples are differentiated by a hyphen and a suffix number.

Thus, in Table I, the notation "L1'-3" indicates that the resin used was resin 1', that it has been lauroylated, and that it is the third lauroylated resin in the series. In Table II, the designation "LS1'-3" denotes the same lauroylated resin after sulfonation.

TABLE II (a).—SWELLING OF ACYL-SULFONATED RESINS

| Solvent | 1' | S1' | A1' | AS1' | CS1 | LS1'-1 |
|---|---|---|---|---|---|---|
| N-heptane | <0.05 | 0.14 | <0.05 | 0.14 | | <0.05 |
| Diethyl ether | 1.12 | 0.41 | 0.10 | 0.17 | | 0.25 |
| Cyclohexane | 1.12 | 0.24 | 0.05 | 0.18 | 0.03 | 0.14 |
| Benzene | 4.92 | 0.35 | 1.20 | 0.27 | 0.30 | 0.19 |
| Chloroform | | | | | 1.15 | |
| Acetone | 0.84 | 1.42 | 1.16 | 0.72 | | 1.37 |
| n-Decanol | 0.24 | 5.39 | 0.21 | 0.38 | | 2.87 |
| Dichloroethane | 4.80 | 0.62 | 4.73 | 1.67 | 0.57 | 0.30 |
| n-Pentanol | | | | | | 2.63 |
| i-Pentanol | | | | | | 2.56 |
| Nitroethane | | | | | 0.33 | |
| i-Butanol | | | | | | 2.58 |
| n-Butanol | 0.12 | 4.40 | 0.23 | 0.92 | | 2.80 |
| t-Butanol | | | | | | 2.13 |
| n-Propanol | | | | | | 2.90 |
| i-Propanol | | | | | | 2.69 |
| Ethanol | | | | | 1.29 | 2.95 |
| Methanol | 0.12 | 6.23 | 0.24 | 0.60 | 1.75 | 3.16 |
| Water | <0.05 | 6.44 | 0.18 | 0.51 | 1.71 | 4.21 |

TABLE II (b).—SWELLING OF ACYL-SULFONATED RESINS

| Solvent | LS1'-2 | LS1'-3 | LS1-6 | L1'-7 | LS1'-7 | LS1-9 |
|---|---|---|---|---|---|---|
| n-Heptane | 0.67 | 0.29 | | 1.27 | 0.06 | 0.16 |
| Diethyl ether | 1.30 | 1.27 | | 1.34 | 0.51 | 0.80 |
| Cyclohexane | 1.18 | 0.66 | 0.40 | 1.76 | 0.13 | |
| Benzene | 1.96 | 1.07 | 0.85 | 2.85 | 0.64 | |
| Chloroform | | | 2.21 | | | |
| Acetone | 1.36 | 1.82 | | 0.41 | 1.75 | 1.55 |
| n-Decanol | 2.78 | 2.94 | | 1.25 | 2.71 | |
| Dichloroethane | 2.33 | 1.35 | 0.98 | 4.18 | 0.94 | |
| n-Pentanol | | | | | 2.65 | |
| i-Pentanol | | | | | 2.58 | |
| Nitroethane | | | | 0.29 | | |
| i-Butanol | | | | | 2.72 | |
| n-Butanol | 2.65 | 2.70 | 1.31 | 0.58 | 2.89 | |
| t-Butanol | | | | | 2.33 | |
| n-Propanol | | | | | 2.65 | |
| i-Propanol | | | | | 2.42 | |
| Ethanol | | | | 1.15 | 2.66 | |
| Methanol | 1.53 | 2.41 | 0.98 | <0.05 | 2.94 | 2.00 |
| Water | 0.29 | 0.44 | 0.24 | <0.05 | 0.83 | 0.52 |

The data set forth in Tables I and II show that there is a regular sequence of properties in the polymers as the degree of acrylation is increased and as the degree of sulfonation is varied. The resins possess three different kinds of groups, namely aryl, alkyl and polar (sulfonic acid) groups, and different ratios of these groups produce resins of a wide and continuous range of variability.

These resins are characterized by excellent mechanical properties; they are firm beads, comparable in every way to the ordinary ion-exchange materials, and they exhibit ion-exchange capacities well within the practical range, even for those polymers which swell as greatly in hexane as they do in water. They are useful in a variety of ways as suggested above, particularly where it is desired to carry out ion-exchange operations in non-aqueous, nonpolar media. By way of example, an equimolar mixture of leurosine and vincaleukoblastine, which are closely related alkaloids, can be separated readily by dissolving the mixture in a 1:1 mixture of dichloroethane

TABLE I.—PREPARATION AND PROPERTIES OF OLEOPHILIC RESINS

| | Acylation | | Hexane Swelling | $SO_3$/Ph | $SO_3$/TEP | Hexane Swelling [1] | Capacity Sulfonation | |
|---|---|---|---|---|---|---|---|---|
| | Method | Percent | | | | | Meg./g. | Percent |
| Number: | | | | | | | | |
| 1' | B | 0 | <0.05 | 0.8 | 3 | [3] 0.14 | 3.52 | 51 |
| A1' | B | 86 | <0.05 | 0.8 | 3 | [3] 0.14 | 1.44 | 23 |
| C1 | A | 96 | | 4 | 3 | [2] 0.03 | 1.71 | 54 |
| L1'-1 | A | 42 | | 5 | 3 | [3] <0.05 | 3.17 | 78 |
| L1'-2 | B | 90 | | 0.5 | 3 | [3] 0.67 | 0.83 | 24 |
| L1'-3 | B | 82 | | 0.9 | 3 | [3] 0.29 | 1.40 | 42 |
| L1-4 | A | 90 | 1.32 | 2 | 2 | 0.22 | 1.14 | 39 |
| L1-5 | A | 90 | 1.32 | 3 | 3 | 0.29 | 1.39 | 48 |
| L1-6 | A | 94 | | 4 | 3 | [2] 0.40 | 0.99 | 36 |
| L1'-7 | B | 98 | [3] 1.27 | 5 | 3 | [3] 0.06 | 2.57 | 84 |
| L1-8 | A | 95 | 1.42 | 6 | 3 | 0.17 | 2.53 | 90 |
| L1-9 | A | 98 | | 7 | 3 | 0.16 | 2.00 | 69 |
| L1-10 | A | 90 | 1.32 | 12 | 4 | 0.12 | 2.40 | 70 |
| L1-11 | A | 96 | 1.32 | 13 | 7 | 0.07 | 2.79 | 100 |
| L1-12 | A | 96 | 1.32 | 20 | 7 | 0.06 | 3.25 | (2.8) |
| L2-1 | A | 95 | 1.28 | 3 | 3 | 0.65 | 0.55 | 20 |
| L2-2 | A | 85 | 1.38 | 6 | 3 | 0.15 | 2.42 | 82 |
| ST2 | A | 66 | 1.57 | 6 | 3 | 0.11 | 2.70 | (2.2) |

[1] Swelling after sulfonation. [2] Swelling in cyclohexane. [3] Swelling in heptane.
A—acetal; C—caproyl; L—lauroyl; ST—stearoyl.
(□) is theoretical capacity.
$SO_3$/Ph—Molar ratio of $SO_3$ used to phenyl rings present.
$SO_3$/TEP—Weight ratio of $SO_3$ to triethylphosphate in sulfonating mixture.

and methanol, and charging the solution onto a column containing the resin designated above as LS1'-2, and eluting with n-butylamine. Leuorsine is eluted first, followed by vincaleukoblastine, and the separation is remarkably clean-cut.

Carboxylic acid resins

Carboxylic acid resins were prepared by the copolymerization of methacrylic acid, (MA) dodecylmethacrylate (DMA) with a small amount of divinylbenzene (DVB) added for cross-linking. For the following discussion, the resins are in the hydrogen state, unless otherwise stated.

A monomer mixture was prepared and nitrogen was bubbled through it for five minutes immediately prior to use to remove oxygen. An appropriate 200 ml. flask in a constant temperature bath at 85° was used, first, 100 ml. of saturated sodium chloride was added to act as suspension medium and salt out the fairly soluble MA. Then nitrogen was bubbled through for ten minutes and the monomer mixture added with rapid stirring for four hours under nitrogen. After ten minutes, 1 g. of soluble starch in 10 ml. of saturated sodium chloride was added to act as suspension stabilizer and prevent clumping of beads. After four hours the product was filtered on sintered glass, washed with water, then acetone and then hexane. It was then dried in vacuo. Under a microscope, the spherical particles were found to range in diameter from 0.1–0.3 mm.

Table III summarizes the composition and properties of three of these resins, respectively designated MD-1, MD-2 and MD-3. The monomer mixture always contained 1% DVB (as pure DVB) and 2% benzoyl peroxide (by weight). Yields were 83–90% due in part to the solubility of MA and incomplete recovery of very fine particles. The capacities of the resins were from 83 to 94% of that predicted from their compositions; the relatively high solubility of MA in water compared to DMA is probably responsible for the variation observed. Swelling equilibrium was reached rapidly, within one hour to at least 90% equilibrium.

TABLE III.—PROPERTIES OF OLEOPHILIC CARBOXYLIC RESINS

|  | Example | | |
|---|---|---|---|
|  | 1 | 2 | 3 |
| MA/DMA (mole ratio) | 2 | 1 | 1/2 |
| Swelling (g. solvent/g. dry resin): | | | |
| Hexane | 0.02 | 0.20 | 0.36 |
| Benzene | 0.47 | 1.23 | 1.11 |
| Water | 1.00 | 0.70 | 0.54 |
| Acetone | 1.53 | 1.25 | 0.66 |
| Capacity (meg./g) | 4.41 | 2.68 | 1.46 |
| Capacity percent theoret | 93.9 | 91.1 | 83.3 |

The data of Table III show as anticipated, that the substitution of polar methacrylic groups by apolar dodecylmethacrylate groups increases the swelling of this polymer in hydrocarbon solvents and reduces its swelling in water, at the same degree of cross-linking. As the apolar nature of the polymer is increased, its capacity must be necessarily lowered.

Sulfonated styrene-isobutylene resins

Ter-polymers of styrene, isobutylene and DVB were prepared then sulfonated to produce oleophilic cation-exchange resins. The same base polymer can be chloromethylated and then aminated to make the corresponding anion-exchange resin. The methyl chloride, isobutylene and propane were liquified as needed by passing the gas through a glass trap in a Dry Ice-acetone mixture. A 4% solution of aluminum chloride in ethyl chloride was prepared and stored dry at −10°, then diluted as used with methyl chloride or propane as a 0.5% solution. For one sequence of polymerizations, a mixture of styrene, DVB, isobutylene and methyl chloride was made at −80° (measured with a thermocouple), and 60 ml. of 0.5% aluminum chloride in methyl chloride added with vigorous stirring. The reaction was rapid, with evolution of methyl chloride and hydrogen chloride. The temperature then rose slowly to −30°. The polymer formed as a sticky mass. Then methanol was added to deactivate the catalyst, the resins washed with acetone and dried in vacuo. Yields ranged from 30 to 60%. Resin IS-1 was prepared in a similar manner but employing propane. The catalyst also employed propane and the reaction temperature was −65°.

These resins were swelled prior to sulfonation; this is helpful for sulfonation of copolymers having a relatively small fraction of benzene groups.

The swelling agent employed was acetylenetetrachloride ($CHCl_2CHCl_2$) and swelling equilibrium was attained in within 15 minutes. Tetrachloroethylene $$(CCl_2CCl_2)$$

was found to be equally suitable and without the toxic properties of the former. The swollen resin particles were treated for 8 hours at 100° with concentrated sulfuric acid containing 0.2 percent silver sulfate as catalyst, then washed successively with acetone and water and dried in vacuo. Each resin was Soxhlet extracted with hexane under reflux for several days, then redried for use.

The oleophilic IS resins were somewhat rubbery in nature and irregular in shape. Table II summarizes their preparative procedures and properties. The density of resin I-2 was 0.76 in benzene and hexane and that of resin IS-2 was 1.00 in the same solvents.

Table II shows that by the proper balance of hydrophobic and hydrophilic groups one can achieve approximately equal swelling in hexane and benzene on one hand and in water on the other (see Resin IS-2). Rates of exchange were comparable in all three solvents. In comparing the properties of these resins with oleophilic polymers prepared by side-chain substitution of acyl groups, it is seen that the position of substitution plays an important role but not a crucial one.

For most purposes, the preferred polymers are those of the type first described, in which each monomer unit carries a phenyl side group capable of accepting the acyl and ion-exchange substituent groups. If desired, the physical properties of the product may be modified by copolymerizing a phenyl-containing monomer such as styrene with another ethylenically-unsaturated monomer such as methyl methacrylate or vinyl chloride. Such copolymers, however, being less rich in substituted phenyl groups, do not have ion-exchange capacity equal to a pure polystyrene polymer or the like, and are therefore not preferred for most applications.

TABLE II.—PROPERTIES OF SULFONATED STYRENE, ISOBUTYLENE COPOLYMERS

[Resins in Hydrogen Form]

|  | Resin | | | |
|---|---|---|---|---|
|  | IS-1 | I-2 | IS-2 | IS-3 |
| Monomer Compn. (g): | | | | |
| Styrene | 3.6 | 7.3 | 7.3 | 8.2 |
| DVB | 2.0 | 2.0 | 2.0 | 3.0 |
| Isobutylene | 28 | 28 | 28 | 21 |
| Methyl chloride | 35 | 35 | 35 | |
| Propane | | | | 30 |
| Swelling: | | | | |
| Hexane | 0.10 | 5.3 | 1.10 | 1.32 |
| Benzene | | 6.4 | 1.21 | |
| $CCl_4$ | | | 3.60 | |
| Dioxane | 2.12 | 0.83 | 2.22 | |
| Acetone | | 0.20 | | 0.77 |
| Water | 3.05 | | 0.97 | 0.86 |
| Capacity (meg. g.⁻¹) | 2.83 | | 1.25 | 1.14 |
| Capacity (calculated) | 2.5 | | 1.9 | 1.3 |

Swelling of Dowex 50-X2 is 0.03–0.04 in hexane and benzene, and 3.73 in water.

While this invention has been described with reference to certain preferred embodiments and illustrated by way of certain examples, these are illustrative only, as many alternatives and equivalents will readily occur to those skilled in the art, without departing from the spirit or proper scope of the invention. The invention is therefore

We claim:
1. An ion-exchange resin consisting of a polymeric matrix having a carbon-chain backbone and regularly-occurring substituted phenyl groups as side groups on said backbone, at least a substantial proportion of said phenyl groups being doubly substituted by (a) an aliphatic acyl group containing from about 2 to about 20 carbon atoms and (b) an ion-exchange group selected from the group consisting of sulfonic acid and quaternary ammonium groups.

2. An ion-exchange resin consisting essentially of a polymeric matrix representable by the formula:

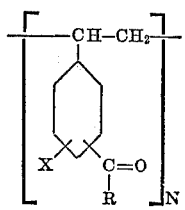

wherein X is an ion-exchange group selected from the group consisting of sulfonic acid and quaternary ammonium groups, R is an aliphatic hydrocarbon radical containing from about 1 to about 19 carbon atoms, and N is greater than unity.

3. An ion-exchange resin according to claim 2, wherein R is a straight-chain alkyl group of 11 carbon atoms.

4. An ion-exchange resin consisting essentially of a polymeric matrix representable by the formula:

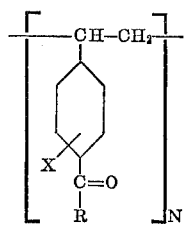

wherein X is an ion-exchange group selected from the group consisting of sulfonic acid and quaternary ammonium groups, R is an aliphatic hydrocarbon radical containing from 1 to about 19 carbon atoms, and N is greater than unity.

References Cited

UNITED STATES PATENTS

| | | | |
|---|---|---|---|
| 3,226,380 | 12/1965 | Knight | 260—212 |
| 3,259,592 | 7/1966 | Fox et al. | 260—2.2 |
| 3,304,294 | 2/1967 | Leavitt et al. | 260—93.5 |
| 2,798,053 | 7/1957 | Brown | 260—2.2 |

FOREIGN PATENTS

| | | |
|---|---|---|
| 849,066 | 9/1960 | Great Britain. |
| 1,082,056 | 11/1960 | Germany. |

OTHER REFERENCES

Helfferich, Ion Exchange, N.Y. McGraw Hill, 1962 pages 38 and 41 relied on.

F. D. ANDERSON, Primary Examiner.
M. GOLDSTEIN, Assistant Examiner.

U.S. Cl. X.R.
260—2.2, 86.1, 85.1, 88.2, 93.5